United States Patent [19]

Caspers

[11] Patent Number: 5,161,138
[45] Date of Patent: Nov. 3, 1992

[54] DEVICE FOR REMOVING A DISK-SHAPED RECORDED MEDIUM FROM THE COMPARTMENTS OF A MAGAZINE AND FOR PLAYING THE MEDIUM

[75] Inventor: Johannes Caspers, Villingen-Schwenningen, Fed. Rep. of Germany

[73] Assignee: Deutsche Thomson-Brandt GmbH, Villingen-Schwenningen, Fed. Rep. of Germany

[21] Appl. No.: 651,046

[22] Filed: Feb. 4, 1991

Related U.S. Application Data

[63] Continuation of Ser. No. 235,650, Aug. 24, 1988, abandoned.

[30] Foreign Application Priority Data

Aug. 27, 1987 [DE] Fed. Rep. of Germany ....... 3728587

[51] Int. Cl.[5] .......................... G11B 17/22; G11B 3/38
[52] U.S. Cl. ......................................... 369/36; 369/34; 369/77.1
[58] Field of Search ..................................... 369/34–39; 360/92; 224/37; 414/287, 409, 422, 424

[56] References Cited

U.S. PATENT DOCUMENTS

| 4,072,991 | 2/1978 | Kok . | |
| 4,616,357 | 10/1986 | Nakayama | 369/36 X |
| 4,742,504 | 5/1988 | Takasuka et al. | 369/36 |
| 4,796,244 | 1/1989 | Tsuruta et al. | 369/38 |
| 4,918,548 | 4/1990 | O'Donnell | 360/92 |

Primary Examiner—Eugene R. LaRoche
Assistant Examiner—Christopher R. Glembocki
Attorney, Agent, or Firm—Max Fogiel

[57] ABSTRACT

An arrangement for removing a disk-shaped recorded medium from compartments of a magazine, in which a member is movable up and down along a side of the magazine from which the disk-shaped recorded medium is to be removed. The movable member is driven only on a first side thereof. A spring supports the movable member only on a second side which lies opposite to the first side of the movable member. The spring is in the form of a torsion spring with a long arm, and has a resiliency that is independent of the distance traveled by the spring within its range of travel. The long arm on the torsion spring is used to support the movable member. A pin on the movable member rests against the end of the long spring arm.

13 Claims, 1 Drawing Sheet

DEVICE FOR REMOVING A DISK-SHAPED RECORDED MEDIUM FROM THE COMPARTMENTS OF A MAGAZINE AND FOR PLAYING THE MEDIUM

The present application is a continuation of the parent application Ser. No. 235,650 filed Aug. 24, 1988 now abandoned.

BACKGROUND OF THE INVENTION

The invention concerns a device for removing a disk-shaped recorded medium from the compartments of a magazine, along the removal side of which the device can be moved up and down like an elevator, and for playing the medium.

Compact-disk players wherein a device of this type for removing and playing a compact disk can be moved up and down like an elevator by means of a spindle on each side are known. To remove a desire disk, the device travels up the two spindles to the level of the compartment containing the disk. The desired disk is then removed, shifted into the playing position, and played. In most compact-disk players, the device is lowered while the disk is being played.

Other compact-disk players are equipped with two rods or two racks and several pinions instead of two spindles to move the device up and down like an elevator.

One drawback of these compact-disk players is that they involve many small components like pinions, racks, spindles, and worm gears for example that generate unpleasant noise during operation. Another drawback is that they take up a lot of space for the spindles, racks and pinions, or rods. Furthermore, cogwheels, racks and pinions, worm gears, spindles, and rods make the equipment more expensive.

SUMMARY OF THE INVENTION

The object of the present invention is accordingly, to provide a device for removing a disk-shaped recorded medium from the compartments of a magazine and for playing the medium that will generate little unpleasant noise and take up little space.

This object is attained in accordance with the invention in that there is a drive mechanism on only one side of the device and in that there is a spring that supports the device only on the side opposite the drive mechanism.

DESCRIPTION OF THE PREFERRED EMBODIMENTS

The invention will now be described and explicated with reference to the embodiment illustrated in the figures.

Figure 1:
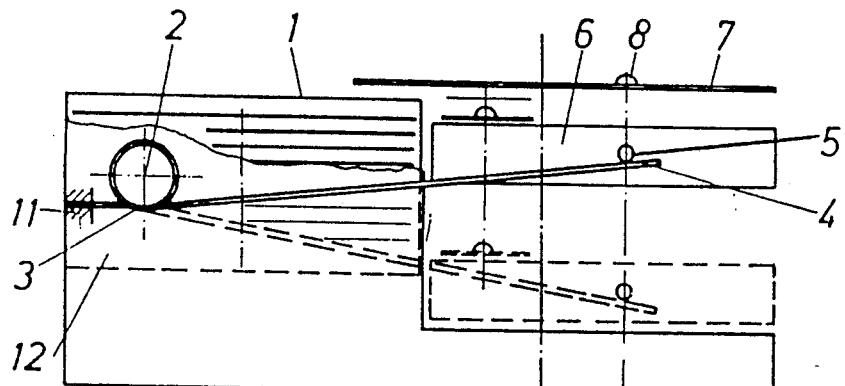
FIG. 1 is a side view of one embodiment of the device in accordance with the invention in conjunction with a magazine.

FIG. 1 illustrates the side of the device in accordance with the invention that accommodates the spring that supports the device. The device is driven by the mechanism 15.

A housing 12 that accommodates a magazine 1 with several compartments for compact disks is provided with a pin 2 that has a torsion spring 3 coiled around it and that is secured by an anchoring structure 11. Torsion spring 3 has a long arm 4 that supports by way of a pin 5 the device 6 for removing and playing a compact disk. The device is represented in the position in which it is removing the uppermost compact disk in magazine 1. The position in which it removes the lowermost compact disk in magazine 1 is represented by broken lines. A lid 7 covers the top of device 6.

Figure 2:
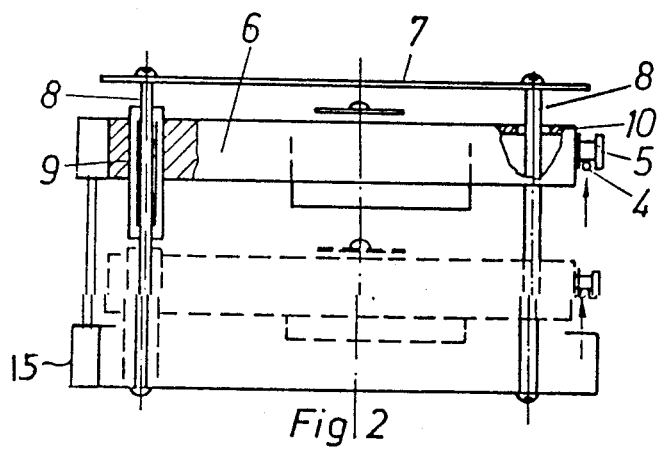
FIG. 2 is a front view of the same embodiment in conjunction with the magazine.

FIG. 2 is a front view of device 6. The long arm 4 on torsion spring 3 supports, as represented by the arrow, device 6 on pin 5. Two positioning rods 8 constitute a parallel guide that keeps device 6 level as it moves up and down like an elevator while removing compact disks from the individual compartments in magazine 1. On the side associated with the drive mechanism, device 6 is positioned on a positioning rod 8 by means of a positioning tube 9 with a circular cross-section. One the side with torsion spring 3, the device is positioned on positioning rod 8 by means of a longitudinal slot 10 because a strictly lateral motion is of greater advantage on that side. The position in which device 6 removes the uppermost compact disk in magazine 1 is represented by continuous lines and the position in which it removes the lowermost disk is, as in FIG. 1, represented by broken lines.

Figure 3:
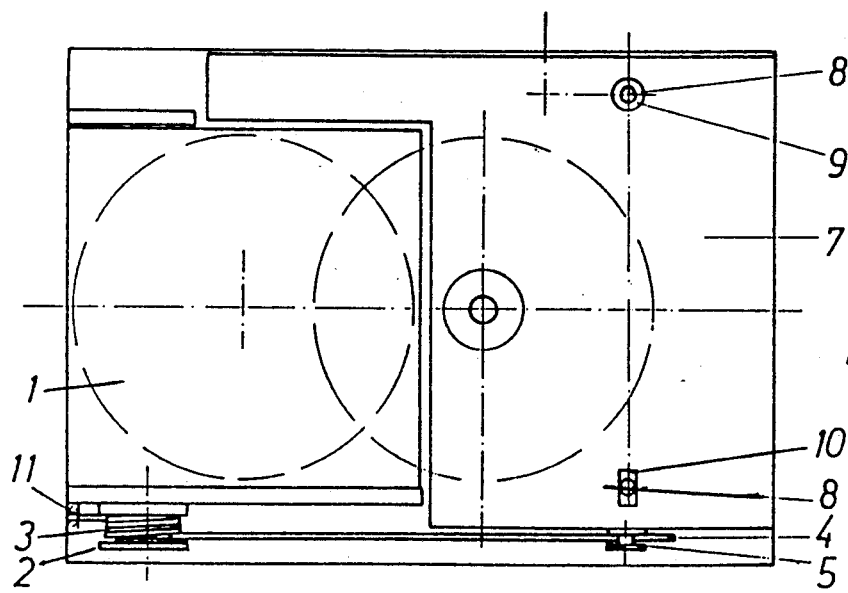
FIG. 3 is a top view of the embodiment in conjunction with the magazine.

The top view in FIG. 3 shows that the pin 2 in housing 12, like the pin 5 in device 6, has a groove to accommodate torsion spring 3 to prevent the spring or its arm 4 from sliding off pins 2 or 5. Several windings of torsion spring 3 coil around pin 2. Torsion spring 3 is secured in place by anchoring structure 11.

The drive mechanism, which is for simplicity's sake illustrated in none of the figures, can be for example a rack with pinions, a spindle, a belt, or a rod. Since there is a drive mechanism on only one side, only half as many cogwheels, racks and pinions, rods, belts, etc. are necessary, and the level of unpleasant noise generated by the drive mechanism when it is in operation is about 50% lower because there are only half as many noisy moving parts. Because the second drive mechanism is replaced by a spring, the device in accordance with the invention can be smaller. The spring is large enough to support the device with a constant force corresponding to half the weight of the device. The resiliency of torsion spring 3 can, due to its long arm 4, be considered approximately constant over the range of travel.

The invention is especially appropriate for compact-disk players, draw-disk players, videodisc players, and optico-magnetic equipment.

I claim:

1. An arrangement for removing a disk-shaped recorded medium from compartments of a magazine, comprising: a magazine with at least one side from which the disk-shaped recorded medium is to be removed; movable means movable up and down along said side of said magazine from which the disk-shaped recorded medium is to be removed; said movable means being adjacent said side of said magazine and having two oppositely facing sides; means for driving said movable means and located at one of said two oppositely facing sides of said movable means; and spring means supporting said movable means only on the other one of said two oppositely facing sides of said movable means.

2. An arrangement as defined in claim 1, wherein said spring means has a predetermined distance range of travel, said spring means having a resiliency independent of distance travelled within said range of travel.

3. An arrangement as defined in claim 1, including anchoring means for securing said spring means on said housing.

4. An arrangement as defined in claim 1, including lid means for covering said movable means.

5. An arrangement as defined in claim 1, including guide means on each said side of said movable means; and positioning rod means guided by said guide means.

6. An arrangement for removing a disk-shaped recorded medium from compartments of a magazine, comprising: a magazine with at least one side from which disk-shaped recorded medium is to be removed; movable means movable up and down along said side of said magazine from which the disk-shaped recorded medium is to be removed; said movable means being adjacent said side of said magazine and having two oppositely facing sides; means for driving said movable means and located at one of said two oppositely facing sides of said movable means; spring means supporting said movable means only on the other one of said two oppositely facing sides of said movable means; said spring means having a predetermined distance range of travel, said spring means having a resiliency independent of distance travelled within said range of travel; said spring means comprising a torsion spring having a substantially long arm.

7. An arrangement as defined in claim 6, including a housing for receiving said magazine; a pin on said housing, said torsion spring having windings coiled around said pin.

8. An arrangement as defined in claim 7, wherein said pin on said housing has a groove for preventing said spring from slipping out of location.

9. An arrangement as defined in claim 6, wherein said arm on said torsion spring supports said movable means.

10. An arrangement as defined in claim 9, including a pin on said movable means and resting against said arm on said torsion spring.

11. An arrangement as defined in claim 7, wherein said pin on said movable means has a groove for preventing said arm on said spring from slipping out of location.

12. An arrangement for removing a disk-shaped recorded medium from compartments of a magazine, comprising: a magazine with at least one side from which the disk-shaped recorded medium is to be removed; movable means movable up and down along said side of said magazine from which the disk-shaped recorded medium is to be removed; said movable means being adjacent said side of said magazine and having two oppositely facing sides; means for driving said movable means and located at one of said two oppositely facing sides of said movable means; and spring means supporting said movable means only on the other one of said two oppositely facing sides of said movable means, said another side being opposite said one side on which said movable means is driven; guide means on each said side of said movable means; and positioning rod means guided by said guide means.

13. An arrangement as defined in claim 12, wherein said guide means on said one side of said movable means comprises a positioning tube with circular cross-section, the guide means on said other side of said movable means being a longitudinal slot.

* * * * *